W. W. OLDHAM.
AGRICULTURAL IMPLEMENT.
APPLICATION FILED JUNE 15, 1908.
974,512.
Patented Nov. 1, 1910.
3 SHEETS—SHEET 2.
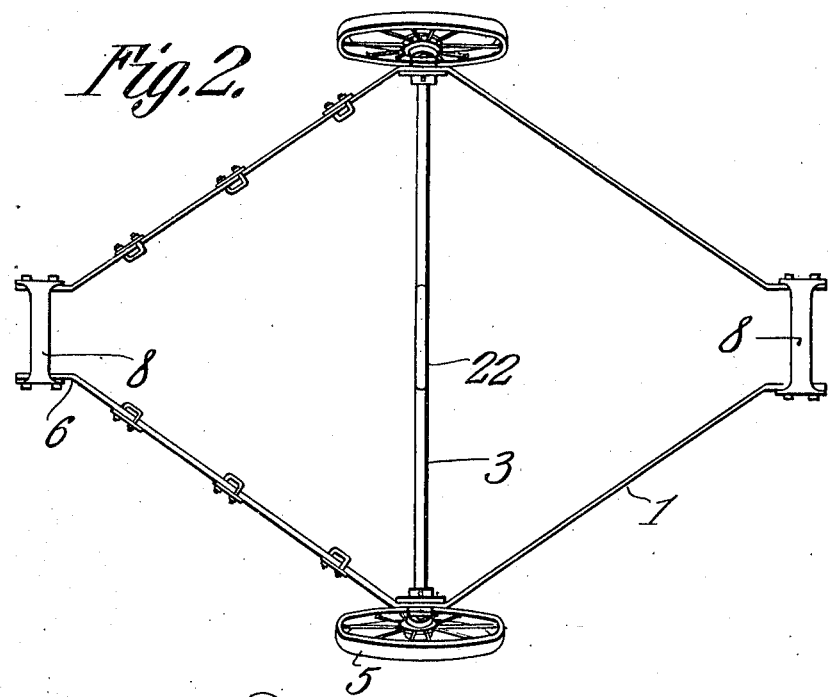
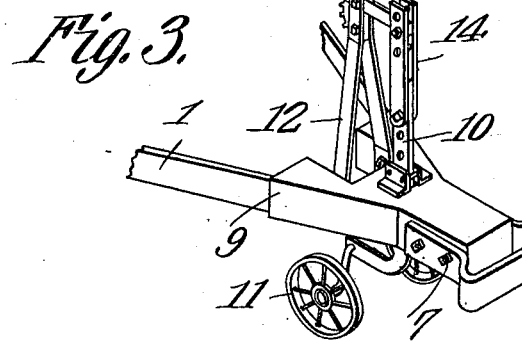
Witnesses
Inventor
William W. Oldham.
By C. A. Snow & Co
Attorneys

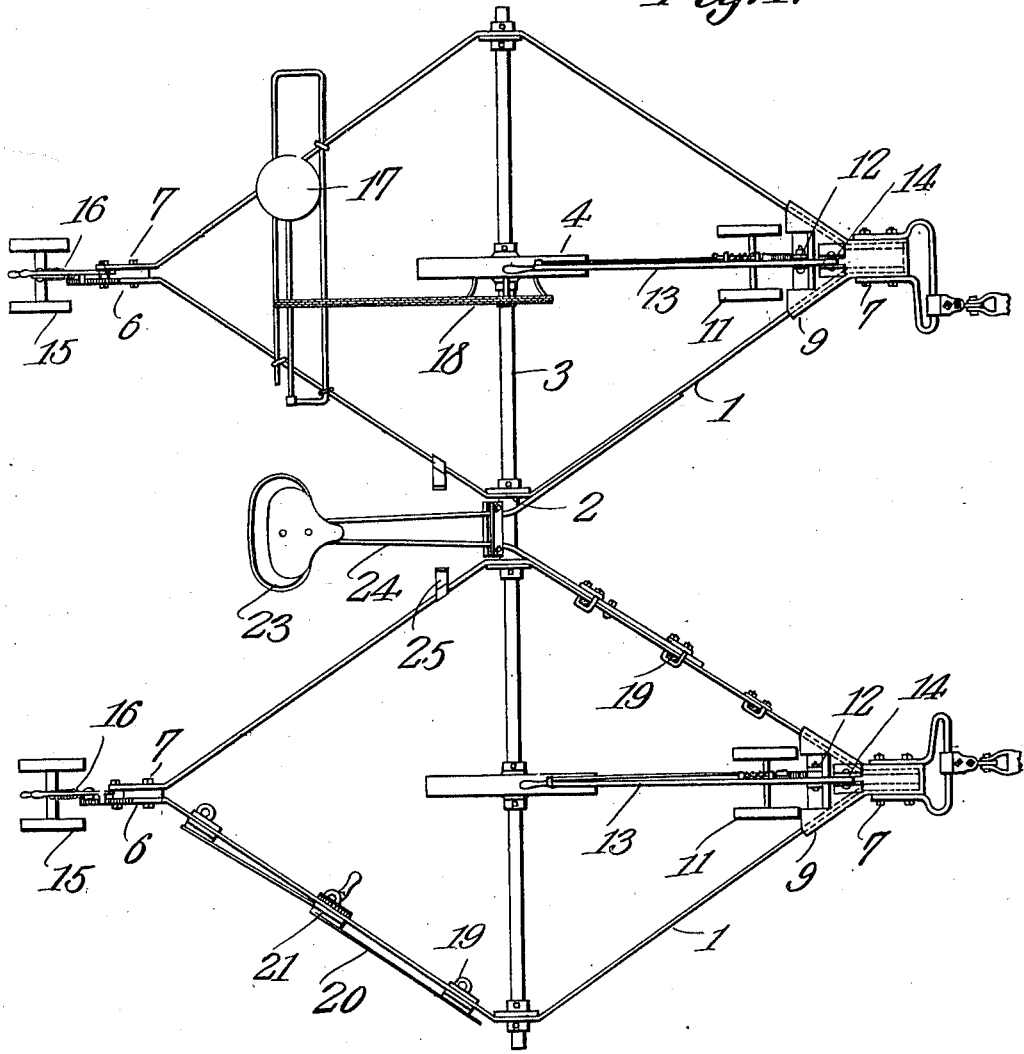

W. W. OLDHAM.
AGRICULTURAL IMPLEMENT.
APPLICATION FILED JUNE 15, 1908.

974,512.

Patented Nov. 1, 1910.
3 SHEETS—SHEET 3.

Witnesses

Inventor
William W. Oldham
By C. A. Snow & Co.
Attorneys

UNITED STATES PATENT OFFICE.

WILLIAM W. OLDHAM, OF BOWIE, TEXAS.

AGRICULTURAL IMPLEMENT.

974,512.

Specification of Letters Patent.

Patented Nov. 1, 1910.

Application filed June 15, 1908. Serial No. 438,629.

*To all whom it may concern:*

Be it known that I, WILLIAM W. OLDHAM, a citizen of the United States, residing at Bowie, in the county of Montague and State of Texas, have invented a new and useful Agricultural Implement, of which the following is a specification.

This invention has relation to agricultural implements, and it consists in the novel construction and arrangement of its parts as hereinafter shown and described.

The object of the invention is to provide an implement adapted to be used for agricultural purposes which may be advantageously employed as a cultivator, a plow, or a planter. The parts of the implement may also be adjusted so that it may be used as a lister.

With this object in view, the implement consists of a single or a series of diamond members which are supported upon wheels, and the implement may be used as a single row cultivator or implement, or a straddle row implement, and is means provided for raising and lowering the body or frame of the implement upon its wheel supports. The parts of the frame of the implement may be adjusted so as to operate upon the ground or soil in any desired manner, and any kinds or styles of ground engaging implement may be mounted upon the frame for the purpose of working the soil.

Figure 4:
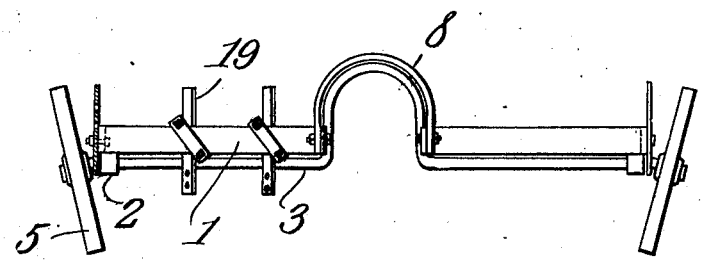
Figure 5:
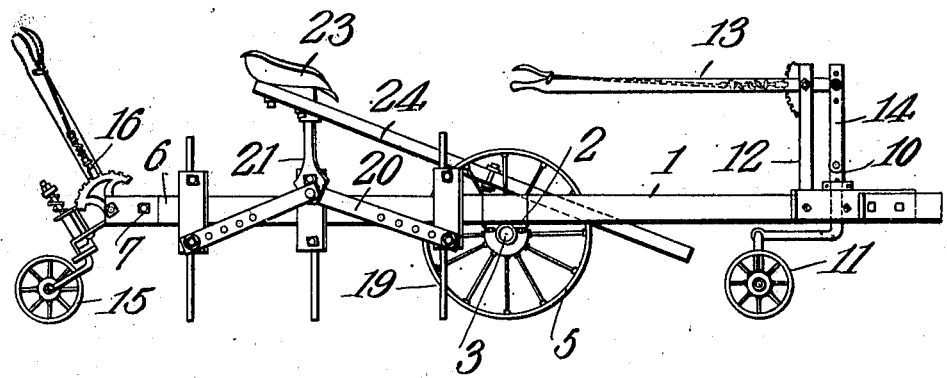

In the accompanying drawings:—Figure 1 is a top plan view of the implement showing one arrangement of the parts thereof. Fig. 2 is a top plan view showing a modified arrangement of one of the members of the implement. Fig. 3 is a perspective view of a wheel supported hood which may be used at one end of the implement. Fig. 4 is a front elevation showing the manner of inserting an arch member between the side members of the implement, and Fig. 5 is a side elevation of the implement as shown in Fig. 1 of the drawings.

In the form of the invention as illustrated in Fig. 1, binary gang frames are employed, while in the form of the invention illustrated in Fig. 2, but a single gang frame is used. This gang frame is made up of side bars 1. Said bars are of the same configuration and are provided with end portions which are angularly disposed. The said bars when placed together are adapted to form a gang frame which is substantially rhomb-shaped, and each bar 1 is provided at its middle with a bearing 2. The axle 3 is adapted to pass transversely across the gang frame and is located in the bearings 2 thereof. The axle 3 may support the center wheels 4 as illustrated in Fig. 1, or the side wheels 5 as illustrated in Fig. 2 may be mounted upon the said axle. The bars 1 are provided at their front and rear ends with the parallel sections 6 which may be connected together by cross bolts 7 as shown in Fig. 1, or which may be connected with the arches 8 as shown in Fig. 2.

In the form of the invention as illustrated in Fig. 1 the hoods 9 are slid longitudinally over the forward ends of the side bars 1, and through each hood 9 is a vertically adjustable shank 10 which is mounted at its lower end upon a truck 11. Uprights 12 are also mounted upon the hood 9 and a lever 13 is fulcrumed between the upper end portions of each pair of uprights 12. Links 14 pivotally connect the forward end of the lever 13 with the upper portion of the shank 10.

In the arrangement as shown in Fig. 1 of the drawings, the rear end portions of the gang frames are supported by the caster wheels 15 and lever mechanisms 16 are associated with the said caster wheels 15 whereby the rear end portions of the gang frames may be raised and lowered with relation to the said wheels 15. It is also obvious that by manipulating the lever 13 the forward end portions of the gang frames may be raised and lowered. Thus it is possible at times to lift the gang frames to such an extent that the wheels 4 will be moved out of contact with the surface of the ground, and when this is done, all parts of the implement which are operated by the wheels 5 or the axles 3 are thrown out of gear and remain at rest while the implement, as an entirety, moves in a forward or rearward direction. Seed dropping mechanisms illustrated at 17 in Fig. 1 may be mounted upon the gang frames and they may be operatively connected with the sprocket wheels 18 attached to the sides of the wheel 4. All ground engaging devices as indicated at 19 may be mounted at suitable intervals upon the side bars 1 of the gang frames, and the said devices 19 may be connected together by means of the links and lever mechanism 20 and 21 respectively, whereby the said devices 19 may be shifted along the side portions of the side bars 1 of the gang frames.

In the form of arrangement as illustrated in Fig. 1, each gang frame is adapted to operate over the space between the rows of plants, while in the form of arrangement as illustrated in Fig. 2 the gang frame is adapted to operate as a straddle row, or upon opposite sides of a single row of plants.

The axle 3 as shown in Fig. 2 is provided at its middle with an arched section 22 which is in alinement with arches 8 located at the front and rear ends of the gang frames.

The seat 23 is provided with metallic strips 24 which may be clamped at their lower ends to the side bars 1 of the gang frames in the manner as shown in Fig. 1 of the drawings, and the foot rests 25 may be mounted upon the side bars 1 of the said gang frames.

From the above description it is obvious that a frame is provided upon which may be mounted earth engaging devices of any desired pattern, and that the frame is so connected together that it may be easily and readily adapted to work at its side portions upon opposite sides of a row of plants, or in the space between two adjacent rows of plants. Thus the implement may be especially adapted to work to advantage several crops of different character.

Having described my invention what I claim as new and desire to secure by Letters Patent is:

In an agricultural implement, the combination with a gang frame having side bars standing oblique to the line of draft, the earth engaging devices, seed dropping mechanism, and seat carried thereby, and the main axle and wheels supported by the frame midway between its front and rear ends; of caster wheels at the rear end of the frame, means for adjusting them vertically, a hood secured over the front ends of the side bars of the frame and having uprights, a lever journaled in the latter, a shank vertically adjustable through said hood and connected with the lever, and a truck carried by the lower end of the shank.

In testimony that I claim the foregoing as my own, I have hereto affixed my signature in the presence of two witnesses.

WILLIAM W. OLDHAM.

Witnesses:
D. M. McDonald,
John Speer.